(12) United States Patent
Robinson et al.

(10) Patent No.: US 8,043,645 B2
(45) Date of Patent: Oct. 25, 2011

(54) METHOD OF MAKING BEVERAGES WITH ENHANCED FLAVORS AND AROMAS

(75) Inventors: Urano A. Robinson, Seattle, WA (US); J. Marcio da Cruz, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 656 days.

(21) Appl. No.: 12/170,396

(22) Filed: Jul. 9, 2008

(65) Prior Publication Data

US 2010/0009039 A1  Jan. 14, 2010

(51) Int. Cl.
A23F 5/00  (2006.01)
(52) U.S. Cl. ......... 426/432; 426/425; 426/595; 426/541
(58) Field of Classification Search ............ 426/595, 426/541, 493, 425
See application file for complete search history.

(56) References Cited

U.S. PATENT DOCUMENTS

| | | |
|---|---|---|
| 2,650,034 A | 8/1953 | Wiemer |
| 2,955,768 A | 3/1959 | Engi |
| 3,261,689 A | 7/1966 | Ponzoni |
| 3,544,331 A | 12/1970 | Hair |
| 3,565,635 A | 2/1971 | Mahlmann |
| 3,652,292 A | 3/1972 | Bach et al. |
| 3,652,293 A | 3/1972 | Lombana et al. |
| 3,660,108 A | 5/1972 | Mednis |
| 3,697,288 A | 10/1972 | McSwiggin |
| 3,713,842 A | 1/1973 | Lubsen et al. |
| 3,771,591 A | 11/1973 | Larsen |
| 3,939,291 A | 2/1976 | Katz |
| 3,944,677 A | 3/1976 | Katz |
| 3,965,269 A | 6/1976 | Lee et al. |
| 3,969,533 A | 7/1976 | Donnelly et al. |
| 3,979,528 A | 9/1976 | Mahlmann |
| 3,985,905 A | 10/1976 | Scelia et al. |
| 3,991,223 A | 11/1976 | Baron et al. |
| 4,001,454 A | 1/1977 | Jindra et al. |
| 4,007,290 A | 2/1977 | Zeitlin et al. |
| 4,007,291 A | 2/1977 | Siedlecki et al. |
| 4,057,652 A | 11/1977 | Lawrence |
| 4,064,795 A | 12/1977 | Ackerman |
| 4,072,761 A | 2/1978 | Margolis et al. |
| 4,076,856 A | 2/1978 | Zeitlin et al. |
| 4,081,561 A | 3/1978 | Meyer et al. |
| 4,100,305 A | 7/1978 | Gregg |

(Continued)

FOREIGN PATENT DOCUMENTS

CA  989246 A1  5/1976

(Continued)

OTHER PUBLICATIONS

AGA AB, Reference installation for cryo grinding of spices. Internal technical documentation FOO-155-9111-1000-e and FOO-154-9111-2000-e.

(Continued)

*Primary Examiner* — Anthony Weier
(74) *Attorney, Agent, or Firm* — Knobbe Martens Olson & Bear LLP

(57) ABSTRACT

The present embodiments generally relate to beverages with enhanced flavors and aromas and method of making same. Some embodiments of the present application are directed to soluble coffee and methods of making soluble coffee with improvements in such qualities as taste and aroma.

40 Claims, 3 Drawing Sheets

U.S. PATENT DOCUMENTS

| | | | |
|---|---|---|---|
| 4,100,306 A | 7/1978 | Gregg et al. | |
| 4,101,681 A | 7/1978 | Hurlow et al. | |
| 4,107,339 A | 8/1978 | Shrimpton | |
| 4,147,097 A | 4/1979 | Gregg | |
| 4,156,031 A | 5/1979 | Hamell et al. | |
| 4,158,067 A | 6/1979 | Wouda | |
| 4,169,164 A | 9/1979 | Hubbard et al. | |
| 4,204,464 A | 5/1980 | Strobel | |
| 4,221,341 A | 9/1980 | Schymura et al. | |
| 4,224,351 A | 9/1980 | Sundt et al. | |
| 4,267,200 A | 5/1981 | Klien et al. | |
| 4,275,085 A | 6/1981 | Gregg | |
| 4,276,315 A | 6/1981 | Katz et al. | |
| 4,277,509 A | 7/1981 | Wouda | |
| 4,281,023 A | 7/1981 | Pyves | |
| 4,283,432 A | 8/1981 | Mitchell et al. | |
| 4,303,686 A | 12/1981 | Stolz et al. | |
| 4,303,689 A | 12/1981 | Winter et al. | |
| 4,313,265 A | 2/1982 | Dwyer, Jr. | |
| 4,317,841 A | 3/1982 | Brambilla et al. | |
| 4,322,447 A | 3/1982 | Hubbard | |
| 4,324,808 A | 4/1982 | Wertheim et al. | |
| 4,333,484 A | 6/1982 | Keritsis | |
| 4,335,149 A | 6/1982 | Stipp | |
| 4,352,829 A | 10/1982 | Noyes et al. | |
| 4,366,920 A | 1/1983 | Greenfield, Jr. | |
| 4,379,172 A | 4/1983 | Liu | |
| 4,389,422 A | 6/1983 | Hudak | |
| RE31,427 E | 10/1983 | Lubsen et al. | |
| 4,474,820 A | 10/1984 | Hawes et al. | |
| 4,505,940 A | 3/1985 | Jones et al. | |
| 4,506,684 A | 3/1985 | Keritsis | |
| 4,528,200 A | 7/1985 | Coleman | |
| 4,547,378 A | 10/1985 | Saleeb et al. | |
| 4,560,571 A | 12/1985 | Sato et al. | |
| 4,565,706 A | 1/1986 | Wertheim et al. | |
| 4,594,256 A | 6/1986 | Zemelman et al. | |
| 4,594,257 A | 6/1986 | Leblanc et al. | |
| 4,594,258 A | 6/1986 | Vitti et al. | |
| 4,605,175 A | 8/1986 | Weber | |
| 4,606,921 A | 8/1986 | Liu | |
| 4,618,500 A | 10/1986 | Forquer | |
| 4,640,839 A | 2/1987 | Hsu | |
| 4,673,580 A | 6/1987 | Matsuda et al. | |
| 4,701,333 A | 10/1987 | Margolis et al. | |
| 4,707,368 A | 11/1987 | Vogel et al. | |
| 4,724,620 A | 2/1988 | Hsu | |
| 4,759,940 A | 7/1988 | Cattaneo et al. | |
| 4,793,990 A | 12/1988 | Grollier et al. | |
| 4,794,010 A | 12/1988 | Jones et al. | |
| 4,798,730 A | 1/1989 | Scoville et al. | |
| 4,805,523 A | 2/1989 | Stuckey et al. | |
| 4,830,869 A | 5/1989 | Wimmers et al. | |
| H0673 H | 9/1989 | Hullah et al. | |
| 4,867,992 A | 9/1989 | Boniello et al. | |
| 4,886,674 A | 12/1989 | Seward et al. | |
| 4,900,575 A | 2/1990 | Cale et al. | |
| 4,903,585 A | 2/1990 | Wimmers et al. | |
| 4,919,962 A | 4/1990 | Arora et al. | |
| 4,975,295 A | 12/1990 | Sierra | |
| 4,981,699 A | 1/1991 | Inada et al. | |
| 4,983,408 A | 1/1991 | Colton | |
| 5,008,125 A | 4/1991 | Cale et al. | |
| 5,012,629 A | 5/1991 | Rehman et al. | |
| 5,030,473 A | 7/1991 | Ghodsizadeh et al. | |
| 5,035,908 A | 7/1991 | Arora et al. | |
| 5,043,177 A | 8/1991 | Chimel et al. | |
| 5,047,252 A | 9/1991 | Liu et al. | |
| 5,079,026 A | 1/1992 | Arora et al. | |
| 5,087,469 A | 2/1992 | Acree | |
| 5,089,280 A | 2/1992 | Ben-Nasr et al. | |
| 5,122,374 A | 6/1992 | Dupoy De Guitaard et al. | |
| 5,182,926 A | 2/1993 | Carns et al. | |
| 5,204,136 A | 4/1993 | Hellemons | |
| 5,222,364 A | 6/1993 | Carns et al. | |
| 5,225,223 A | 7/1993 | Vitzthum et al. | |
| 5,229,153 A | 7/1993 | Blanc | |
| 5,229,155 A | 7/1993 | Weisemann et al. | |
| 5,236,729 A | 8/1993 | Schlecht et al. | |
| 5,242,700 A | 9/1993 | Schlecht | |
| 5,323,623 A | 6/1994 | Carns et al. | |
| 5,328,708 A | 7/1994 | Rizzi et al. | |
| 5,332,591 A | 7/1994 | Ogden | |
| 5,338,575 A | 8/1994 | Ben-Nasr et al. | |
| 5,368,875 A * | 11/1994 | Hibi et al. | 426/466 |
| 5,399,370 A | 3/1995 | Hsu | |
| 5,433,962 A | 7/1995 | Stipp | |
| 5,455,057 A | 10/1995 | Symbolik et al. | |
| 5,465,656 A | 11/1995 | Ogden | |
| 5,471,917 A | 12/1995 | Hsu | |
| 5,474,792 A | 12/1995 | Arora et al. | |
| 5,479,848 A | 1/1996 | Versini | |
| 5,513,809 A | 5/1996 | Perkel | |
| 5,538,750 A | 7/1996 | Yamaguchi et al. | |
| 5,554,400 A | 9/1996 | Stipp | |
| 5,576,044 A | 11/1996 | Chmiel et al. | |
| 5,624,699 A | 4/1997 | Lang | |
| 5,741,538 A | 4/1998 | Stipp et al. | |
| 5,750,178 A | 5/1998 | Cheng et al. | |
| 5,853,787 A | 12/1998 | Gurol | |
| 5,882,716 A | 3/1999 | Munz-Schaerer et al. | |
| 5,882,717 A | 3/1999 | Panesar et al. | |
| 5,888,549 A | 3/1999 | Buchholz et al. | |
| 5,897,903 A | 4/1999 | Gerhard-Rieben et al. | |
| 5,904,948 A | 5/1999 | Sartorio et al. | |
| 5,922,384 A | 7/1999 | Blackwell et al. | |
| 5,922,385 A | 7/1999 | Stipp et al. | |
| 5,928,703 A | 7/1999 | Chmiel et al. | |
| 5,958,497 A | 9/1999 | Grimm et al. | |
| 5,972,409 A | 10/1999 | Liu et al. | |
| 6,036,984 A | 3/2000 | Sartorio et al. | |
| 6,045,843 A | 4/2000 | Gurol | |
| 6,048,567 A | 4/2000 | Villagran et al. | |
| 6,090,424 A | 7/2000 | Mickowski et al. | |
| 6,106,877 A | 8/2000 | Allington et al. | |
| 6,120,831 A | 9/2000 | Zeller et al. | |
| 6,149,957 A | 11/2000 | Mandralis et al. | |
| 6,165,536 A | 12/2000 | Heeb et al. | |
| 6,174,557 B1 | 1/2001 | Gamez-Rumpf et al. | |
| 6,177,119 B1 | 1/2001 | Zeller et al. | |
| 6,203,837 B1 | 3/2001 | Kalenian | |
| 6,207,206 B1 | 3/2001 | Mickowski et al. | |
| 6,244,162 B1 | 6/2001 | Dahmen | |
| 6,277,429 B1 | 8/2001 | Zeller et al. | |
| 6,289,948 B1 | 9/2001 | Jeannin et al. | |
| 6,291,006 B1 | 9/2001 | Butterbaugh et al. | |
| 6,296,890 B1 | 10/2001 | Navarini et al. | |
| 6,319,537 B1 | 11/2001 | Cheng et al. | |
| 6,347,725 B1 | 2/2002 | Yoakim et al. | |
| 6,352,736 B2 | 3/2002 | Borland et al. | |
| 6,358,552 B1 | 3/2002 | Mandralis et al. | |
| 6,379,737 B1 | 4/2002 | Butterbaugh et al. | |
| 6,399,131 B2 | 6/2002 | Zeller et al. | |
| 6,428,833 B1 | 8/2002 | Suwelack et al. | |
| 6,470,920 B2 | 10/2002 | Jeannin et al. | |
| 6,548,094 B2 | 4/2003 | Kalenian | |
| 6,592,922 B2 | 7/2003 | Furrer et al. | |
| 6,669,976 B2 | 12/2003 | Fritz | |
| 6,698,333 B2 | 3/2004 | Halliday et al. | |
| 6,749,882 B2 | 6/2004 | Fortune, Jr. | |
| 6,758,130 B2 | 7/2004 | Sargent et al. | |
| 6,777,007 B2 | 8/2004 | Cai | |
| 6,777,014 B2 | 8/2004 | Singh | |
| 6,783,791 B2 | 8/2004 | Bunke et al. | |
| 6,814,997 B2 | 11/2004 | Maier et al. | |
| 6,841,185 B2 | 1/2005 | Sargent et al. | |
| 6,849,285 B2 | 2/2005 | Masek et al. | |
| 6,861,086 B2 | 3/2005 | Buckingham et al. | |
| 6,964,789 B2 | 11/2005 | Maier et al. | |
| 6,979,472 B2 | 12/2005 | Apiscopa et al. | |
| 7,211,279 B1 | 5/2007 | Gianelli | |
| 7,220,440 B2 | 5/2007 | Dria et al. | |
| 7,316,826 B2 | 1/2008 | Kindel et al. | |
| 7,364,764 B2 | 4/2008 | Janssens | |
| 7,377,207 B2 | 5/2008 | Hug et al. | |
| 7,384,435 B1 | 6/2008 | Stepanian et al. | |
| 7,387,063 B2 | 6/2008 | Vu et al. | |

| Patent/Pub No. | Date | Name |
|---|---|---|
| 7,398,725 B2 | 7/2008 | Rebordosa et al. |
| 7,399,490 B2 | 7/2008 | Agarwala et al. |
| 7,401,545 B2 | 7/2008 | Hu et al. |
| 7,404,828 B1 | 7/2008 | Nicola |
| 7,412,921 B2 | 8/2008 | Hu et al. |
| 7,419,692 B1 | 9/2008 | Kalenian |
| 7,422,750 B2 | 9/2008 | Umeda et al. |
| 7,425,344 B2 | 9/2008 | Korolchuk et al. |
| 7,431,950 B2 | 10/2008 | Agarwala et al. |
| 7,437,990 B2 | 10/2008 | Duch |
| 7,439,403 B2 | 10/2008 | Holscher |
| 7,441,495 B2 | 10/2008 | Halle et al. |
| 7,458,316 B2 | 12/2008 | Scelza |
| 7,469,628 B2 | 12/2008 | Mandralis et al. |
| 7,470,443 B2 | 12/2008 | Ceriali et al. |
| 7,550,164 B2 | 6/2009 | Agarwala et al. |
| 7,569,240 B2 | 8/2009 | Brizio |
| 7,604,826 B2 | 10/2009 | Denisart et al. |
| 7,622,141 B2 | 11/2009 | Agarwala et al. |
| 7,658,141 B2 | 2/2010 | Masek et al. |
| 7,681,492 B2 | 3/2010 | Suggi Liverani et al. |
| 7,703,383 B2 | 4/2010 | Knitel |
| 7,713,566 B2 | 5/2010 | Zapp et al. |
| 7,763,300 B2 | 7/2010 | Sargent et al. |
| 7,767,246 B2 | 8/2010 | Smits et al. |
| 7,793,585 B2 | 9/2010 | Rasmussen et al. |
| 7,794,772 B2 | 9/2010 | Goto et al. |
| 2001/0000145 A1 | 4/2001 | Kalenian |
| 2001/0024677 A1 | 9/2001 | Bringe |
| 2001/0036497 A1 | 11/2001 | Zeller et al. |
| 2002/0009533 A1 | 1/2002 | Fortune, Jr. |
| 2002/0012736 A1 | 1/2002 | Borland et al. |
| 2002/0015768 A1 | 2/2002 | Masek et al. |
| 2002/0050301 A1 | 5/2002 | Jeannin et al. |
| 2002/0078831 A1 | 6/2002 | Cai |
| 2002/0152210 A1 | 10/2002 | Johnson et al. |
| 2002/0155209 A1 | 10/2002 | Hardesty et al. |
| 2002/0187241 A1 | 12/2002 | Young et al. |
| 2003/0005826 A1 | 1/2003 | Sargent et al. |
| 2003/0008053 A1 | 1/2003 | Singh |
| 2003/0012858 A1 | 1/2003 | Furrer et al. |
| 2003/0026883 A1 | 2/2003 | Bunke et al. |
| 2003/0033938 A1 | 2/2003 | Halliday et al. |
| 2003/0077372 A1 | 4/2003 | Sargent et al. |
| 2003/0096038 A1 | 5/2003 | Cai |
| 2003/0118707 A1 | 6/2003 | Kalenian |
| 2003/0118709 A1 | 6/2003 | Nakamura |
| 2003/0180431 A1 | 9/2003 | Young et al. |
| 2003/0217643 A1 | 11/2003 | Masek et al. |
| 2004/0005384 A1 | 1/2004 | Cai |
| 2004/0020368 A1 | 2/2004 | Cai |
| 2004/0037905 A1 | 2/2004 | Bringe |
| 2004/0083897 A1 | 5/2004 | Park |
| 2004/0115310 A1 | 6/2004 | Yoakim et al. |
| 2004/0134357 A1 | 7/2004 | Cai |
| 2004/0202767 A1 | 10/2004 | Kindel et al. |
| 2004/0228955 A1 | 11/2004 | Denisart et al. |
| 2004/0241307 A1 | 12/2004 | Knitel |
| 2004/0265449 A1 | 12/2004 | Sargent et al. |
| 2005/0003060 A1 | 1/2005 | Steenhof et al. |
| 2005/0003067 A1 | 1/2005 | Zapp et al. |
| 2005/0031761 A1 | 2/2005 | Brucker et al. |
| 2005/0042353 A1 | 2/2005 | Maier et al. |
| 2005/0048186 A1 | 3/2005 | Lehmberg et al. |
| 2005/0087567 A1 | 4/2005 | Nielsen et al. |
| 2005/0109213 A1 | 5/2005 | Terada |
| 2005/0112253 A1 | 5/2005 | Kalenian |
| 2005/0112265 A1 | 5/2005 | Ceriali et al. |
| 2005/0153050 A1 | 7/2005 | Zapp et al. |
| 2005/0158426 A1 | 7/2005 | Hu et al. |
| 2005/0211102 A1 | 9/2005 | Vu et al. |
| 2005/0255215 A1 | 11/2005 | Agarwala et al. |
| 2005/0279215 A1 | 12/2005 | Cai |
| 2006/0017038 A1 | 1/2006 | Hasenzahl et al. |
| 2006/0070528 A1 | 4/2006 | Kim et al. |
| 2006/0083845 A1 | 4/2006 | Smits et al. |
| 2006/0121174 A1 | 6/2006 | Franke |
| 2006/0134197 A1 | 6/2006 | Uchida et al. |
| 2006/0159827 A1 | 7/2006 | Ha |
| 2006/0165851 A1 | 7/2006 | Brizio |
| 2006/0171938 A1 | 8/2006 | Stock et al. |
| 2006/0227866 A1 | 10/2006 | Ley et al. |
| 2006/0236871 A1 | 10/2006 | Ternite et al. |
| 2006/0280841 A1 | 12/2006 | Cai |
| 2006/0286238 A1 | 12/2006 | Zehentbauer et al. |
| 2007/0003678 A1 | 1/2007 | Zehentbauer et al. |
| 2007/0003683 A1 | 1/2007 | Inoue et al. |
| 2007/0026120 A1 | 2/2007 | Wight et al. |
| 2007/0042083 A1 | 2/2007 | Larkin et al. |
| 2007/0042097 A1 | 2/2007 | Norton et al. |
| 2007/0062375 A1 | 3/2007 | Liverani et al. |
| 2007/0068395 A1 | 3/2007 | Masek et al. |
| 2007/0071869 A1 | 3/2007 | Knitel et al. |
| 2007/0116850 A1 | 5/2007 | Fujii et al. |
| 2007/0160726 A1 | 7/2007 | Fujii et al. |
| 2007/0186784 A1 | 8/2007 | Liverani et al. |
| 2007/0186941 A1 | 8/2007 | Holton, Jr. et al. |
| 2007/0199453 A1 | 8/2007 | Rasmussen et al. |
| 2007/0224331 A1 | 9/2007 | Agarwala et al. |
| 2007/0231443 A1 | 10/2007 | Goto et al. |
| 2007/0237846 A1 | 10/2007 | Agarwala et al. |
| 2007/0237857 A1 | 10/2007 | Silver et al. |
| 2007/0248731 A1 | 10/2007 | Curti et al. |
| 2008/0003337 A1 | 1/2008 | Rasmussen et al. |
| 2008/0008776 A1 | 1/2008 | Back et al. |
| 2008/0008780 A1 | 1/2008 | Streekstra |
| 2008/0038409 A1 | 2/2008 | Nair et al. |
| 2008/0038437 A1 | 2/2008 | Paulig |
| 2008/0044539 A1 | 2/2008 | Perlman et al. |
| 2008/0096969 A1 | 4/2008 | Ley |
| 2008/0099509 A1 | 5/2008 | Mountjoy |
| 2008/0107786 A1 | 5/2008 | Barnekow et al. |
| 2008/0113073 A1 | 5/2008 | Ley et al. |
| 2008/0113077 A1 | 5/2008 | Leloup et al. |
| 2008/0131843 A1 | 6/2008 | Montgomery et al. |
| 2008/0138770 A1 | 6/2008 | Montgomery |
| 2008/0148955 A1 | 6/2008 | Neace et al. |
| 2008/0152768 A1 | 6/2008 | Lan et al. |
| 2008/0152779 A1 | 6/2008 | De Groote et al. |
| 2008/0160139 A1 | 7/2008 | Imison et al. |
| 2008/0160151 A1 | 7/2008 | Zeller et al. |
| 2008/0166451 A1 | 7/2008 | Bel-Rhlid et al. |
| 2008/0171108 A1 | 7/2008 | Dierikx |
| 2008/0175800 A1 | 7/2008 | Schoening et al. |
| 2008/0178743 A1 | 7/2008 | Hug et al. |
| 2008/0187638 A1 | 8/2008 | Hansen |
| 2008/0193625 A1 | 8/2008 | Kawamura et al. |
| 2008/0201241 A1 | 8/2008 | Pecoraro |
| 2008/0202345 A1 | 8/2008 | Delonghi |
| 2008/0213406 A1 | 9/2008 | Baker et al. |
| 2008/0213425 A1 | 9/2008 | Asano et al. |
| 2008/0214675 A1 | 9/2008 | Ley et al. |
| 2008/0215607 A1 | 9/2008 | Kaushansky et al. |
| 2008/0216666 A1 | 9/2008 | Doglioni Majer |
| 2008/0220052 A1 | 9/2008 | Tsujita et al. |
| 2008/0220140 A1 | 9/2008 | Ley et al. |
| 2008/0220147 A1 | 9/2008 | Barrera Rivera et al. |
| 2008/0227832 A1 | 9/2008 | Oka et al. |
| 2008/0227867 A1 | 9/2008 | Ley et al. |
| 2008/0233056 A1 | 9/2008 | Berl |
| 2008/0233265 A1 | 9/2008 | Hibi |
| 2008/0234174 A1 | 9/2008 | Hoelscher |
| 2008/0242740 A1 | 10/2008 | Ley et al. |
| 2008/0245236 A1 | 10/2008 | Ternite et al. |
| 2008/0249189 A1 | 10/2008 | Atwal et al. |
| 2008/0254169 A1 | 10/2008 | MacMahon et al. |
| 2008/0254175 A1 | 10/2008 | Fujimoto |
| 2008/0260893 A1 | 10/2008 | Giffard et al. |
| 2008/0260927 A1 | 10/2008 | Steenhof et al. |
| 2008/0260928 A1 | 10/2008 | MacMahon et al. |
| 2008/0264268 A1 | 10/2008 | Tjen |
| 2008/0273868 A1 | 11/2008 | Boussemart et al. |
| 2008/0280023 A1 | 11/2008 | Kalenian |
| 2008/0286388 A1 | 11/2008 | Shiao |
| 2008/0289509 A1 | 11/2008 | Kodden et al. |
| 2008/0293609 A1 | 11/2008 | Artiga Gonzalez et al. |
| 2008/0295697 A1 | 12/2008 | Kim |
| 2008/0299271 A1 | 12/2008 | Inoue et al. |

| | | | |
|---|---|---|---|
| 2008/0299283 A1 | 12/2008 | Penson et al. | |
| 2008/0305052 A1 | 12/2008 | Ley et al. | |
| 2008/0311245 A1 | 12/2008 | Silver et al. | |
| 2008/0311271 A1 | 12/2008 | Sugimoto et al. | |
| 2008/0311386 A1 | 12/2008 | Wendt | |
| 2008/0314254 A1 | 12/2008 | Terada | |
| 2008/0317923 A1 | 12/2008 | Ley et al. | |
| 2008/0317924 A1 | 12/2008 | Yang | |
| 2008/0317929 A1 | 12/2008 | Popplewell et al. | |
| 2008/0317931 A1 | 12/2008 | Mandralis et al. | |
| 2009/0004335 A1 | 1/2009 | MacMahon et al. | |
| 2009/0005342 A1 | 1/2009 | Takao et al. | |
| 2009/0007792 A1 | 1/2009 | Glucksman et al. | |
| 2009/0007793 A1 | 1/2009 | Glucksman et al. | |
| 2009/0011091 A1 | 1/2009 | Bovetto et al. | |
| 2009/0011095 A1 | 1/2009 | Yamane et al. | |
| 2009/0020018 A1 | 1/2009 | Melzer et al. | |
| 2009/0022855 A1 | 1/2009 | Steenhof et al. | |
| 2009/0022864 A1 | 1/2009 | Steenhof et al. | |
| 2009/0029023 A1 | 1/2009 | Kerler et al. | |
| 2009/0035421 A1 | 2/2009 | Yamane et al. | |
| 2009/0035437 A1 | 2/2009 | Bovetto et al. | |
| 2009/0041864 A1 | 2/2009 | Warlick | |
| 2009/0053381 A1 | 2/2009 | Fukuda et al. | |
| 2009/0061048 A1 | 3/2009 | Kohane et al. | |
| 2009/0068337 A1 | 3/2009 | Bringe et al. | |
| 2009/0074919 A1 | 3/2009 | Smith | |
| 2009/0126577 A1 | 5/2009 | Ternite | |
| 2009/0175986 A1 | 7/2009 | Doglioni Majer | |
| 2009/0186144 A1 | 7/2009 | Chin | |
| 2009/0191320 A1 | 7/2009 | Gu et al. | |
| 2009/0211458 A1 | 8/2009 | Denisart et al. | |
| 2009/0232944 A1 | 9/2009 | MacMahon et al. | |
| 2009/0246326 A1 | 10/2009 | Cary et al. | |
| 2009/0252850 A1 | 10/2009 | Gaonkar et al. | |
| 2009/0258118 A1 | 10/2009 | Gillian | |
| 2009/0274632 A1 | 11/2009 | Li et al. | |
| 2009/0311384 A1 | 12/2009 | MacMahon et al. | |
| 2010/0040733 A1 | 2/2010 | Blank et al. | |
| 2010/0040757 A1 | 2/2010 | Chin | |
| 2010/0043644 A1 | 2/2010 | Suggi Liverani et al. | |
| 2010/0043645 A1 | 2/2010 | Suggi Liverani et al. | |
| 2010/0043646 A1 | 2/2010 | Suggi Liverani et al. | |
| 2010/0080886 A1 | 4/2010 | Hourizadeh | |
| 2010/0112181 A1 | 5/2010 | Taylor et al. | |
| 2010/0119685 A1 | 5/2010 | Van Bergen | |
| 2010/0136178 A1 | 6/2010 | Rapparini | |
| 2010/0173053 A1 | 7/2010 | Ryser et al. | |
| 2010/0173056 A1 | 7/2010 | Yoakim et al. | |
| 2010/0178389 A1 | 7/2010 | Jia et al. | |
| 2010/0178391 A1 | 7/2010 | Macmahon et al. | |
| 2010/0178392 A1 | 7/2010 | Yoakim et al. | |
| 2010/0183790 A1 | 7/2010 | Zapp et al. | |
| 2010/0186599 A1 | 7/2010 | Yoakim et al. | |
| 2010/0239710 A1 | 9/2010 | Cary et al. | |
| 2010/0239734 A1 | 9/2010 | Yoakim et al. | |
| 2010/0275787 A1 | 11/2010 | Bonacci et al. | |
| 2010/0291278 A1 | 11/2010 | Lavie et al. | |
| 2010/0310727 A1 | 12/2010 | Massey et al. | |
| 2010/0313766 A1 | 12/2010 | Suggi Liverani et al. | |

FOREIGN PATENT DOCUMENTS

| | | |
|---|---|---|
| CA | 1 110 104 | 10/1981 |
| CA | 1274115 A1 | 9/1990 |
| CA | 2031362 A1 | 6/1992 |
| CA | 2074441 A1 | 2/1993 |
| CA | 2090169 A1 | 9/1993 |
| CA | 2216852 A1 | 4/1998 |
| CA | 2241489 A1 | 1/1999 |
| CA | 2281411 A1 | 3/2000 |
| CA | 2289178 A1 | 5/2000 |
| CA | 2317799 A1 | 3/2001 |
| CA | 2423681 A1 | 5/2002 |
| CA | 2427549 A1 | 11/2003 |
| CA | 2533021 A1 | 1/2005 |
| CA | 2515079 A1 | 2/2006 |
| CA | 2614668 A1 | 1/2007 |
| CN | 1393147 A | 1/2003 |
| CN | 1545898 A | 11/2007 |
| CZ | 20020664 A3 | 7/2002 |
| DE | 16 92 238 | 10/1971 |
| DE | 197 00 084 | 7/1990 |
| DE | 19826143 A1 | 12/1999 |
| EP | 0 159 754 A3 | 10/1985 |
| EP | 0 195 574 | 9/1986 |
| EP | 0 144 785 B1 | 7/1988 |
| EP | 205244 B1 | 11/1988 |
| EP | 0299106 B1 | 1/1989 |
| EP | 175521 B1 | 3/1989 |
| EP | 216971 B1 | 5/1989 |
| EP | 213247 B1 | 11/1989 |
| EP | 0 215 164 B1 | 12/1989 |
| EP | 396260 A2 | 7/1990 |
| EP | 224338 B1 | 4/1991 |
| EP | 227263 B1 | 4/1991 |
| EP | 420509 A1 | 4/1991 |
| EP | 220889 B1 | 6/1991 |
| EP | 0 195 574 B1 | 1/1992 |
| EP | 0 466 955 A1 | 1/1992 |
| EP | 0 323 592 B1 | 6/1992 |
| EP | 240754 B1 | 8/1992 |
| EP | 532631 B1 | 3/1993 |
| EP | 326740 B1 | 7/1993 |
| EP | 554008 A2 | 8/1993 |
| EP | 0 560 609 | 9/1993 |
| EP | 560609 A1 | 9/1993 |
| EP | 0 482 236 B1 | 2/1994 |
| EP | 0 489 402 B1 | 4/1994 |
| EP | 0 474 005 B1 | 7/1994 |
| EP | 0 509 257 | 12/1994 |
| EP | 354810 B1 | 2/1995 |
| EP | 489401 B1 | 3/1995 |
| EP | 0 499 023 B1 | 4/1995 |
| EP | 0 526 766 B1 | 6/1995 |
| EP | 0 538 512 B1 | 10/1995 |
| EP | 0 532 959 B1 | 11/1995 |
| EP | 700640 B1 | 3/1996 |
| EP | 0 574 034 B1 | 3/1997 |
| EP | 0 891 715 A1 | 1/1999 |
| EP | 0 893 065 A2 | 1/1999 |
| EP | 0 928 561 | 7/1999 |
| EP | 928561 A1 | 7/1999 |
| EP | 0 985 350 A2 | 3/2000 |
| EP | 0 778 735 B1 | 10/2000 |
| EP | 0 826 308 B1 | 12/2000 |
| EP | 1069830 B1 | 1/2001 |
| EP | 1078575 A2 | 2/2001 |
| EP | 1135992 B1 | 9/2001 |
| EP | 0 888 066 B1 | 10/2001 |
| EP | 1 199 948 B1 | 5/2002 |
| EP | 1 201 135 A1 | 5/2002 |
| EP | 0 809 443 B1 | 10/2002 |
| EP | 0 973 406 B1 | 1/2003 |
| EP | 1 374 690 A1 | 1/2004 |
| EP | 1 198 992 B1 | 9/2004 |
| EP | 1 000 548 B1 | 1/2005 |
| EP | 1 600 461 A1 | 11/2005 |
| EP | 1 726 213 A1 | 11/2006 |
| EP | 1 736 063 A1 | 12/2006 |
| EP | 1 370 483 B1 | 4/2008 |
| EP | 1 911 354 A1 | 4/2008 |
| EP | 1 917 860 A1 | 5/2008 |
| EP | 1 917 864 A1 | 5/2008 |
| EP | 1 925 208 A1 | 5/2008 |
| EP | 1 363 501 B1 | 6/2008 |
| EP | 1 645 636 B1 | 6/2008 |
| EP | 1 645 637 B1 | 6/2008 |
| EP | 1 932 457 A1 | 6/2008 |
| EP | 1 949 828 A1 | 7/2008 |
| EP | 1 435 793 B1 | 8/2008 |
| EP | 1 558 118 B1 | 9/2008 |
| EP | 1 967 076 A1 | 9/2008 |
| EP | 1 726 536 B1 | 10/2008 |
| EP | 1 745 702 B1 | 10/2008 |
| EP | 1 761 150 B1 | 10/2008 |
| EP | 1 977 651 A1 | 10/2008 |
| EP | 1 980 258 A1 | 10/2008 |
| EP | 1 985 213 A1 | 10/2008 |

| | | | |
|---|---|---|---|
| EP | 1 557 091 B1 | 11/2008 |
| EP | 1 679 979 B1 | 11/2008 |
| EP | 1 708 579 B1 | 11/2008 |
| EP | 1 987 727 A1 | 11/2008 |
| EP | 1 990 286 A1 | 11/2008 |
| EP | 1 797 772 B1 | 12/2008 |
| EP | 2 000 034 A2 | 12/2008 |
| EP | 2 000 062 A1 | 12/2008 |
| EP | 2 008 938 A1 | 12/2008 |
| EP | 1 759 597 B1 | 1/2009 |
| EP | 2 011 406 A1 | 1/2009 |
| FR | 2 662 584 A1 | 12/1991 |
| GB | 02332 | 5/1916 |
| GB | 161920 A | 4/1920 |
| GB | 1 027 926 | 4/1966 |
| GB | 2 006 603 A | 5/1979 |
| GB | 2 022 394 | 12/1979 |
| GB | 1 564 094 | 4/1980 |
| GB | 2 074 008 | 10/1981 |
| GB | 2 334 659 A | 9/1999 |
| IN | 154041 A1 | 9/1984 |
| JP | 56-094148 * | 6/1981 |
| JP | 61239841 A | 10/1986 |
| JP | 02276536 | 11/1990 |
| JP | 0626457 | 10/1991 |
| JP | 6296457 A | 10/1994 |
| JP | 10066507 A | 3/1998 |
| JP | 2004121138 | 4/2004 |
| JP | 4182471 B2 | 7/2004 |
| JP | 2005-124486 * | 5/2005 |
| JP | 2005-318812 | 11/2005 |
| JP | 2006520607 | 9/2006 |
| NZ | 245739 A | 8/1994 |
| NZ | 244595 A | 4/1995 |
| RU | 2400098 C1 | 9/2010 |
| WO | WO 91/18517 | 12/1991 |
| WO | WO 94/10852 A1 | 5/1994 |
| WO | WO 96/05737 | 2/1996 |
| WO | WO 96/05737 A1 | 2/1996 |
| WO | WO 96/24255 | 8/1996 |
| WO | WO 96/24255 A1 | 8/1996 |
| WO | WO 97/33482 A1 | 9/1997 |
| WO | WO 98/06274 A1 | 2/1998 |
| WO | WO 98/34495 A1 | 8/1998 |
| WO | WO 99/52378 A1 | 10/1999 |
| WO | WO 01/08507 A1 | 2/2001 |
| WO | WO 02/34063 A1 | 5/2002 |
| WO | WO 02/35939 A1 | 5/2002 |
| WO | WO 03011041 A1 | 2/2003 |
| WO | WO 03032743 A1 | 4/2003 |
| WO | WO 2004/082391 A1 | 9/2004 |
| WO | WO 2004/095937 A1 | 11/2004 |
| WO | WO 2005/000031 A2 | 1/2005 |
| WO | WO 2005/039313 A1 | 5/2005 |
| WO | WO 2005122780 A1 | 12/2005 |
| WO | WO 2006/020613 A1 | 2/2006 |
| WO | WO 2006/125505 A1 | 11/2006 |
| WO | WO 2006125505 A1 | 11/2006 |
| WO | WO 2007/002062 A1 | 1/2007 |
| WO | WO 2007/011531 A1 | 1/2007 |
| WO | WO 2007/116350 | 10/2007 |
| WO | WO 2007116350 | 10/2007 |
| WO | WO 2008/047347 A2 | 4/2008 |
| WO | WO 2008/052952 A1 | 5/2008 |
| WO | WO 2008/062886 A1 | 5/2008 |
| WO | WO 2008/067101 A2 | 6/2008 |
| WO | WO 2008/071613 A1 | 6/2008 |
| WO | WO 2008/071744 A2 | 6/2008 |
| WO | WO 2008/082817 A1 | 7/2008 |
| WO | WO 2008/082953 A1 | 7/2008 |
| WO | WO 2008/103157 A2 | 8/2008 |
| WO | WO 2008/107281 A2 | 9/2008 |
| WO | WO 2008/107348 A1 | 9/2008 |
| WO | WO 2008/116021 A1 | 9/2008 |
| WO | WO 2008/123775 A1 | 10/2008 |
| WO | WO 2008/129035 A2 | 10/2008 |
| WO | WO 2008/129053 A1 | 10/2008 |
| WO | WO 2008/130990 A1 | 10/2008 |
| WO | WO 2008/132705 A1 | 11/2008 |
| WO | WO 2008/139205 A2 | 11/2008 |
| WO | WO 2008/148601 A1 | 12/2008 |
| WO | WO 2008/148604 A1 | 12/2008 |
| WO | WO 2008/148650 A1 | 12/2008 |
| WO | WO 2008/148656 A1 | 12/2008 |
| WO | WO 2008/148834 A1 | 12/2008 |
| WO | WO 2009/002724 A1 | 12/2008 |
| WO | WO 2009/006374 A2 | 1/2009 |
| WO | WO 2009/006379 A2 | 1/2009 |
| WO | WO 2009/007246 A2 | 1/2009 |
| WO | WO 2009/012524 A1 | 1/2009 |

OTHER PUBLICATIONS

Lin Transfer Handbook. "Cold Grinding of Food and Spices." Section 7.2.3, pp. 19-20 (Jun. 1992).

Pallmann, H. "The Role of Process Gas in Size Reduction Systems." *Powder and Bulk Engineering International* (Nov. 1999).

Ritter, Rick. "Keep Cool with Cryogenic Grinding." *Chemical Engineering*. 104(4):88-92 (1997).

\* cited by examiner

METHOD OF MAKING BEVERAGES WITH ENHANCED FLAVORS AND AROMAS

BACKGROUND

1. Field

The present embodiments generally relate to beverages with enhanced qualities such as flavor and aroma and method of making same.

2. Description of the Related Art

Many beverages have a distinct taste and aroma that is difficult to duplicate in a more convenient form. One example of such a beverage is coffee. With regular coffee, water is boiled in a coffee pot in advance, and ground roasted coffee beans are put directly in contact with boiling water (the standard amount is 10 g of ground roasted coffee beans per 100 ml of boiling water) and are boiled in boiling water to effect extraction or are similarly extracted by using a percolator or the like. The obtained extract contains caffeine, tannic acid, saccharides, fats, proteins and various aromatic components and it has a fragrance inherent to coffee and a peculiar complicated flavor inclusive of a bitter taste, an astringent taste and an acid taste.

When roasted coffee beans are ground and then allowed to stand in air, they are readily oxidized which degrades the fragrance and flavors, and when tepid water is used for extraction, the contact time for extraction of roasted coffee beans is usually prolonged. Furthermore, if the boiling time is too long or the extract is allowed to stand for a long time, the fragrance and flavor are degraded. Accordingly, even in case of regular coffee, the method of making coffee is difficult, and it is very difficult to obtain coffee rich in flavor and fragrance.

Coffee extract concentrates and coffee extract powders have heretofore been manufactured on an industrial scale, and instant coffee beverages which can instantly be drunk by dissolving them in hot water or cold water have been prepared and marketed. Ordinarily, these instant coffee beverages are prepared according to a process comprising charging ground roasted coffee beans in an extraction tank, extracting the beans with hot water or boiling water, and subjecting the extract to drying treatments such as spray drying, vacuum drying or freeze drying. Instant coffee beverages prepared according to such conventional processes contain components which cannot ordinarily be drunk, though the amounts of these components differ to some extent according to the extraction conditions like the extraction temperature and time, the concentration conditions and the drying conditions.

Many aromas and flavors associated with coffee are very delicate and complex. With conventional soluble coffee, the delicate coffee flavors and aromas are often degraded or lost during processing and manufacturing methods. Coffee aroma is known to be very unstable. As coffee aroma degrades, it generates unpleasant and non-coffee-like notes that are undesirable. This degradation substantially reduces the perceived quality of the product. For this reason, special attention must be paid to the preparation and storage of flavoring components such as coffee aroma so that desirable aroma components are enhanced or undesirable components are reduced or eliminated.

Furthermore, since the extract is exposed to high temperatures for a relatively long period of time during the preparation, the flavor and fragrance are degraded by cooking, evaporation and oxidative decomposition of aromatic components, and the delicate aroma inherent to coffee is lost. The conventional product usually comes to have an excessive scorching taste. In short, the obtained beverage is far from regular coffee in both the flavor and fragrance. The soluble coffee of the present embodiments overcome these problems in the prior art as well as provide additional advantages.

SUMMARY

Some embodiments relate to a soluble coffee product, comprising: a dry coffee extract component; and a pulverized coffee component, wherein the pulverized coffee component has not been extracted, and wherein the pulverized coffee component is added to the dry coffee extract component after the dry coffee extract is dried.

In some embodiments, the pulverized coffee component is added to the dry coffee extract component both before and after the dry coffee extract is dried.

In some embodiments, the dry coffee extract component comprises from about 70% to about 90% of the soluble coffee product and, wherein the ground coffee component comprises from about 10% to about 30% of the soluble coffee product.

In some embodiments, the dry coffee extract component comprises from about 70% to about 99.9% of the soluble coffee product and, wherein the ground coffee component comprises from about 0.1% to about 30% of the soluble coffee product.

In some embodiments, the pulverized coffee component has a mean particle size of about 350 microns or less. In some embodiments, the pulverized coffee component has a median particle size of about 350 microns or less.

Some embodiments further comprise an additive selected from the group consisting of coffee oils, non-coffee oils, non-coffee aromas, and coffee aromas.

Some embodiments further comprise at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, a dry green coffee extract, a wet green coffee extract and an herbal extract.

Some embodiments relate to a method of making a soluble coffee product, comprising: pulverizing coffee beans to form a first pulverized coffee product, grinding or pulverizing coffee beans to form a second ground or pulverized coffee product, extracting the second ground or pulverized coffee product to form an extracted coffee product, combining the first pulverized coffee product with the extracted coffee product to form a first coffee blend, drying the first coffee blend to form a first dried coffee blend, combining the first pulverized coffee product with the first dried coffee blend to form the soluble coffee product.

In some embodiments, the coffee is pre-frozen before being pulverized.

In some embodiments, the coffee is not pre-frozen before being pulverized, further comprising the step of refrigerating the grinding and pulverizing machinery.

In some embodiments, the coffee is pre-frozen, further comprising the step of refrigerating the grinding and pulverizing machinery.

Some embodiments further comprise the step of adding to the first coffee blend at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

In some embodiments, the grinding or pulverizing is carried out at a temperature of from about 20° C. to about 50° C.

Some embodiments further comprise the step of refrigerating grinding and pulverizing machinery to a temperature of about −5° C. or less.

Some embodiments relate to a method of making a soluble coffee product, comprising: grinding or pulverizing coffee beans to form a first ground or pulverized coffee product, grinding or pulverizing coffee beans to form a second ground or pulverized coffee product, pulverizing coffee beans to form a third pulverized coffee product, extracting the first ground or pulverized coffee product and separating the first ground or pulverized coffee product into a coffee flavor component and a coffee aroma component, extracting the second ground or pulverized coffee product to form a first extracted coffee product, combining the coffee aroma component with the extracted coffee product to form a first coffee blend, combining the first coffee blend with the third pulverized coffee product to form a second coffee blend, drying the second coffee blend to form a first dried coffee blend, combining the third pulverized coffee with the first dried coffee blend to form the soluble coffee.

In some embodiments, the coffee is pre-frozen before the pulverizing.

In some embodiments, the coffee is not pre-frozen before the pulverizing, further comprising the step of refrigerating the grinding and pulverizing machinery.

Some embodiments further comprise the step of adding to the first coffee blend at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

In some embodiments, the pulverizing and grinding is carried out at a temperature of from about 20° C. to about 50° C.

In some embodiments, the pulverizing and grinding is carried out at a temperature of less than about 1° C.

In some embodiments, the temperature of the equipment and coffee product in each step is about −5° C. or less.

Some embodiments relate to a soluble coffee product prepared by a method comprising: pulverizing coffee beans to form a first pulverized coffee product grinding or pulverizing coffee beans to form a second ground or pulverized coffee product, extracting the second ground or pulverized coffee product to form an extracted coffee product, combining the first pulverized coffee product with the extracted coffee product to form a first coffee blend, drying the first coffee blend to form a first dried coffee blend, combining the first pulverized coffee product with the first dried coffee blend to form the soluble coffee product.

In some embodiments, the dry coffee extract component comprises from about 70% to about 90% of the soluble coffee product and, wherein the ground coffee component comprises from about 10% to about 30% of the soluble coffee product.

In some embodiments, the dry coffee extract component comprises from about 70% to about 99.9% of the soluble coffee product and, wherein the ground coffee component comprises from about 0.1% to about 30% of the soluble coffee product.

In some embodiments, the ground coffee component has a mean particle size of about 350 microns or less. In some embodiments, the pulverized coffee component has a median particle size of about 350 microns or less.

Some embodiments further comprise at least one selected from the group consisting of coffee oils, non-coffee oils, non-coffee aromas, and coffee aromas.

Some embodiments further comprise at least one additive selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

Some embodiments relate to a method of making a soluble coffee product, comprising: grinding or pulverizing coffee beans to form a first ground or pulverized coffee product, grinding or pulverizing coffee beans to form a second ground or pulverized coffee product, pulverizing coffee beans to form a third pulverized coffee product, extracting the first ground or pulverized coffee product and separating the first ground or pulverized coffee product into at least a first extracted component and a extracted second component, extracting the second ground or pulverized coffee product to form a first extracted coffee product, combining the coffee aroma component with the extracted coffee product to form a first coffee blend, combining the first coffee blend with the third pulverized coffee product to form a second coffee blend, drying the second coffee blend to form a first dried coffee blend, combining the third pulverized coffee with the first dried coffee blend to form the soluble coffee.

In some embodiments, the first extracted component is a flavor component and the second extracted component is an aroma component.

In some embodiments, the coffee is pre-frozen before the pulverizing.

In some embodiments, the coffee is not pre-frozen before the pulverizing, further comprising the step of refrigerating the grinding and pulverizing machinery.

Some embodiments further comprise the step of adding to the first coffee blend at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

In some embodiments, the pulverizing and grinding is carried out at a temperature of from about 20° C. to about 50° C.

In some embodiments, the pulverizing and grinding is carried out at a temperature of less than about 1° C.

In some embodiments, the temperature of the equipment and coffee product in each step is about −5° C. or less.

Some embodiments further comprise the step of adding the first extracted component or the second extracted component to the first dried coffee blend.

DETAILED DESCRIPTION

The following discussion is presented to enable a person skilled in the art to make and use one or more of the present embodiments. The general principles described herein may be applied to embodiments and applications other than those detailed below without departing from the spirit and scope of the disclosure. Therefore the present embodiments are not intended to be limited to the particular embodiments shown, but are to be accorded the widest scope consistent with the principles and features disclosed or suggested herein.

Coffee and other products subjected to processing such as that necessary to make an instant form of the product go through flavor and aroma changes. These changes come from the altering of the initial bonded structures of the compounds within the products. With coffee, any kind of processing can alter the bonded structures of the compounds found in unprocessed coffee beans. Some embodiments relate to a method of adding or restoring the flavor and aroma associated with an unprocessed food product to a processed or instant version of the product. In some embodiments, the product is coffee. Some embodiments relate to methods involving pulverization of, for example, roasted coffee beans, fresh tea leaves, coco beans or other food ingredients as a mean of adding or restoring freshness, flavor and aroma of, for example, soluble coffee, teas, chocolates, etc. Some embodiments also allow for the introduction of different and unique flavors and aromas into food products. Some embodiments allow for the introduction of supplements to food products.

Figure 1:
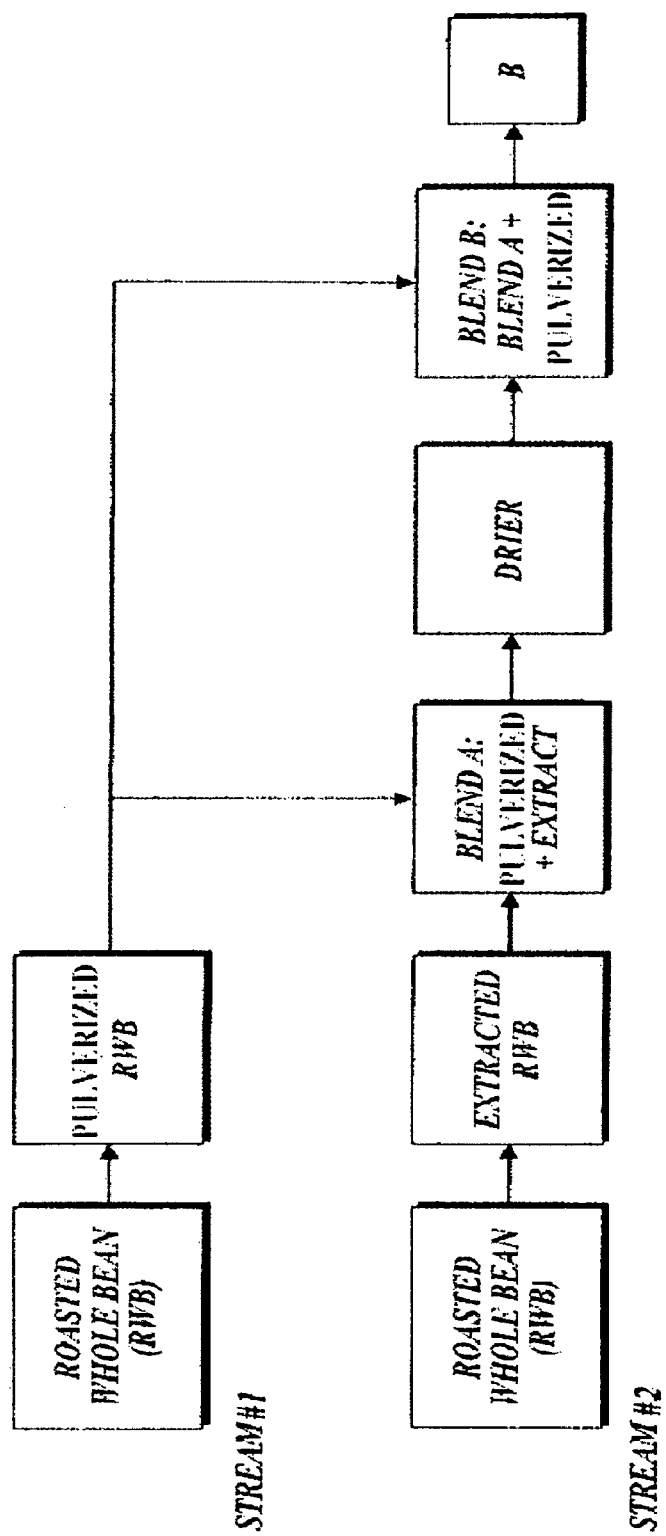
FIG. 1 is a process flow diagram illustrating an overview of one embodiment of a method of making a coffee beverage with enhanced flavor and aroma.

Some embodiments of the present disclosure are directed to soluble coffee and methods of making soluble coffee with improved taste and aroma. Referring to FIG. 1, in accordance with an illustrative embodiment, two streams of roasted whole coffee beans are prepared and treated. In the first stream, roasted whole bean coffee beans are pulverized to form pulverized coffee. In some embodiments, the pulverized coffee has a particle size of less than about 350 microns in diameter. In some embodiments, the pulverized coffee component has a median particle size of about 350 microns or less. In the second stream, roasted whole bean coffee beans are ground or pulverized and extracted to produce a wet coffee extract. A portion of the pulverized coffee from the first stream is added to the wet coffee extract of the second stream to form Blend A.

In the embodiments described in FIG. 1, the combination of pulverized roasted whole bean coffee beans from the first stream with the extracted ground or pulverized whole bean coffee of the second stream at this wet stage of the process adds complexity, including a more authentic coffee flavor and aroma, to the soluble coffee. Blend A is then dried in a drying process (e.g., freeze-dried, hot air dried, or any other drying process). Dried blend A is then combined with at least one additional component to form blend B, which, in this embodiment, is the bulk soluble coffee product. Such components can include, for example, pulverized coffee from the first stream, coffee extract, concentrated coffee, dried coffee, coffee oils, coffee aromas, distillates, flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract and an herbal extract etc. In certain embodiments the dried blend A is combined with pulverized coffee from the first stream to form blend B.

In some embodiments, the dry addition of pulverized coffee to dry coffee extract adds aroma, flavor complexity and body to the finished bulk product. The addition of pulverized coffee can be accomplished by one or more of many different methods, e.g., centrifugal equipment, lightning mixer, ribbon blender, PK blender, sonic methods, etc. In some embodiments, other compounds may be added during the process, including non-coffee oils, non-coffee aromas, coffee aromas, etc. In some embodiments, pulverized coffee can be encapsulated with carbohydrates, soy products, dairy ingredients or other agents. One advantage of the encapsulation is to protect against degradation from environmental factors.

Coffee aromas are the volatile components of coffee that produce the characteristic fragrance of coffee. In some embodiments, the coffee aroma can be provided to the final beverage product in the form of a highly aromatized coffee concentrate. The aromatized coffee concentrate is prepared by adding coffee aroma to a coffee concentrate. Methods of preparing coffee concentrates are well known to one of skill in the art.

In some embodiments, coffee aroma is in the form of natural coffee aroma components that are collected during the preparation of soluble coffee powder. In some embodiments, the natural coffee aroma includes highly volatile aroma components. Highly volatile aroma components are those which condense at a temperature below about 0° C. To recover highly volatile aroma components, volatile aroma components may be flushed from the coffee during processing using an inert carrier gas such as nitrogen. The aroma-laden carrier gas is then chilled to temperatures lower than about −40° C., and sometimes as low as about −195° C., to cause the aroma components to condense. The condensed aroma components are then collected. Suitable procedures for capturing coffee aroma are known to one of skill in the art.

Figure 2:
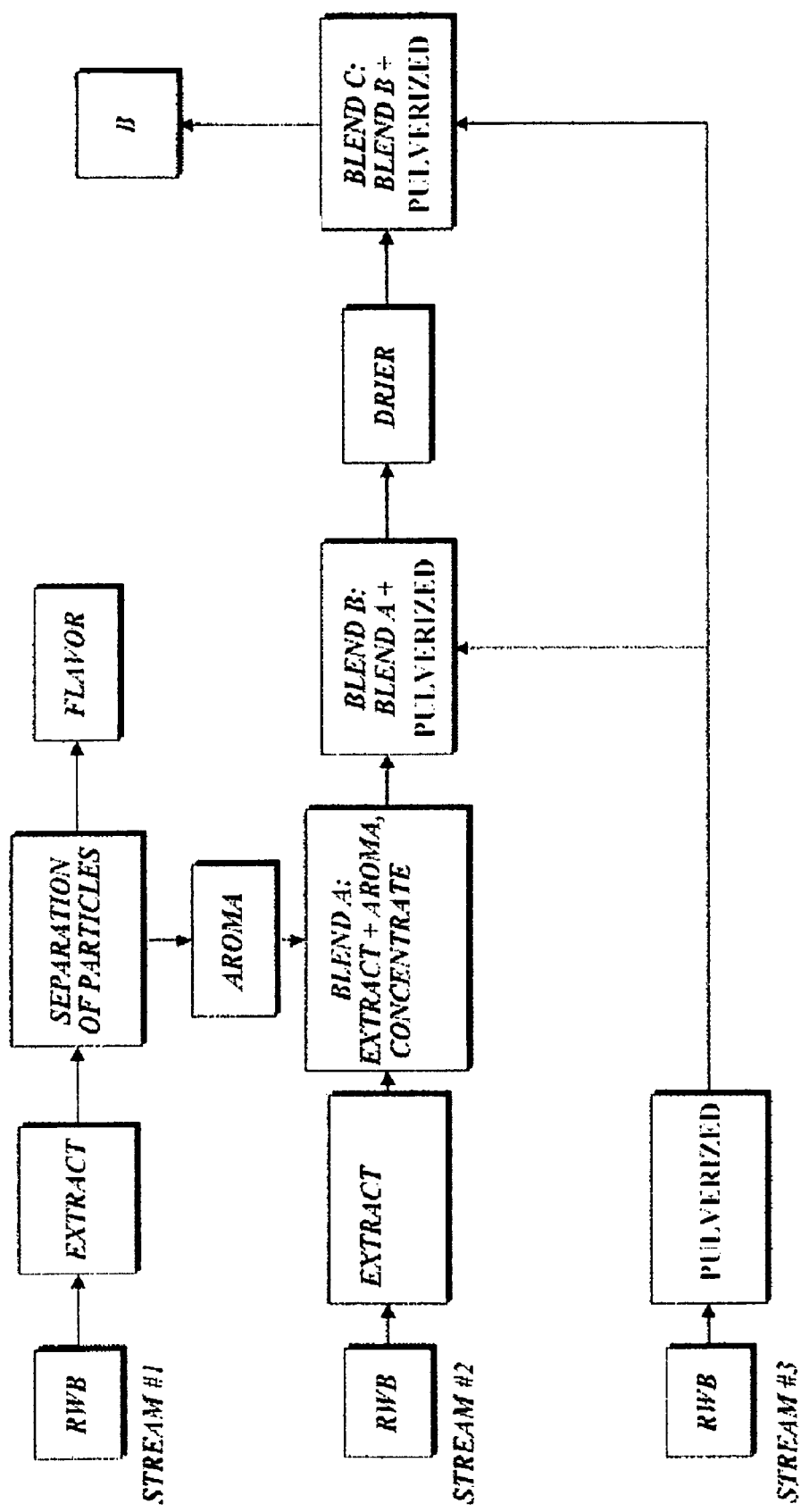
FIG. 2 is a process flow diagram illustrating an overview of one embodiment of a method making a coffee beverage with enhanced flavor and aroma.

Referring to FIG. 2, in accordance with an illustrative embodiment, three streams of roasted whole coffee beans are treated to form a coffee product with enhanced flavor and aroma components. In the first stream, roasted whole bean coffee beans are pulverized or ground to form pulverized or ground coffee. In some embodiments, the pulverized or ground coffee has a particle size of less than about 350 microns in diameter. In some embodiments, the pulverized coffee component has a median particle size of about 350 microns or less in diameter. The pulverized or ground coffee is then extracted to separate the aroma compounds from the flavor compounds. In the second stream, roasted whole bean coffee beans are pulverized or ground and extracted to produce a wet coffee extract. A portion of the separated aroma components from the first stream is added to the wet coffee extract of the second stream to form Blend A. In the third stream, roasted whole bean coffee beans are pulverized and a portion of the resulting pulverized coffee is added to wet blend A to form blend B.

Blend B is then dried in a drying process (e.g., freeze-dried, or any other drying process). Dried Blend B is then combined with at least one of: pulverized coffee from the third stream, coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract and an herbal extract to form Blend C, which, in this embodiment, is the bulk soluble coffee product. In certain embodiments the dried Blend B is combined with pulverized coffee from the third stream to form Blend C. In some embodiments, the flavor components of the extracted pulverized or ground coffee of the first stream are combined with blend A. In some embodiments, the flavor components of the extracted pulverized or ground coffee of the first stream are combined with blend B. In some embodiments, the flavor components of the extracted pulverized or ground coffee of the first stream are combined with blend C.

In some embodiments, the combination of the pulverized or ground roasted whole bean coffee aroma separation components from the first stream with the extracted pulverized or ground whole bean coffee of the second stream at this wet stage of the process adds a unique aroma property, including a more authentic coffee aroma, to the soluble coffee.

Figure 3:
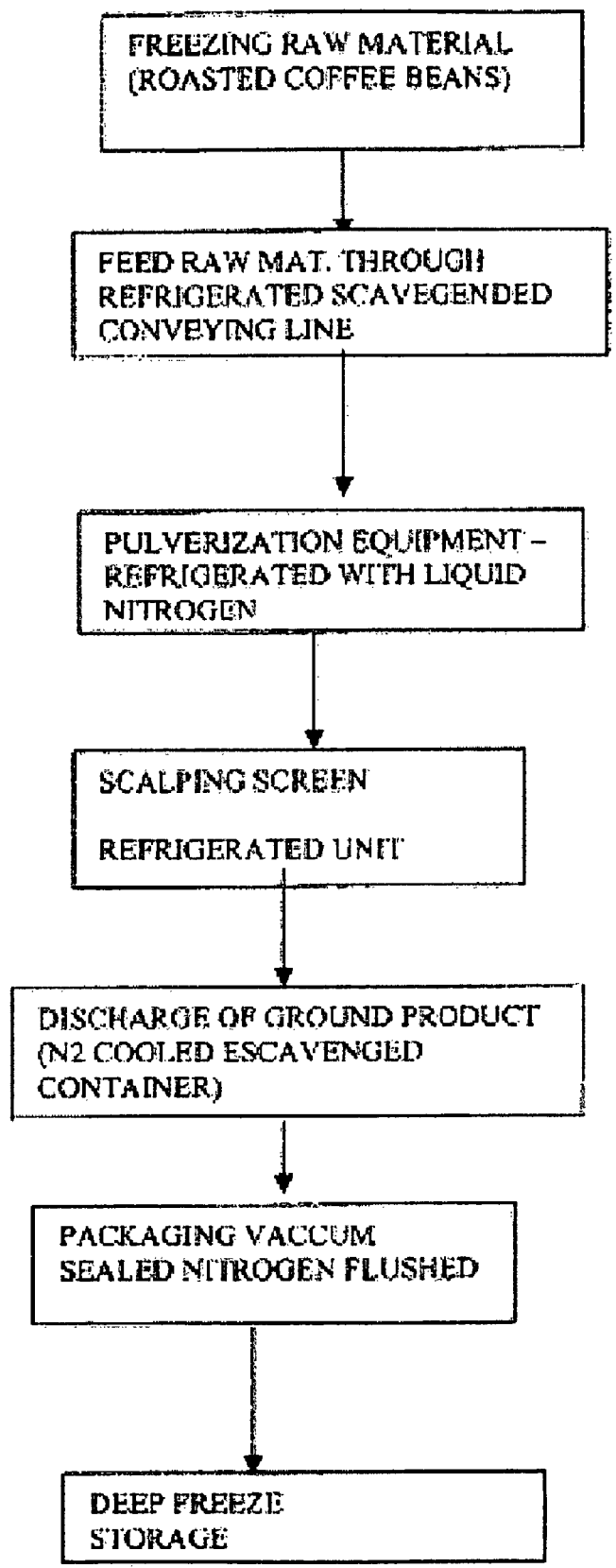
FIG. 3 is a process flow diagram illustrating an overview of one embodiment of a method of pulverizing a raw material in a refrigerated environment.

FIG. 3 depicts an illustrative process for preparing some of the products of certain embodiments. In this example, roasted coffee beans are frozen at a temperature below about −5° C. and then fed through a conveying line that is also refrigerated. Then the product is pulverized in the presence of liquid nitrogen and sent through a scalping screen to ensure the passage of only small particle pulverization product. In some embodiments, liquid nitrogen is added directly to the product. In some embodiments, the liquid nitrogen is used to cool the grinding or pulverizing machinery. In some embodiments the liquid nitrogen is added directly to the product and also used to cool the grinding or pulverizing machinery. In an illustrative embodiment, the ground product is then discharged into packaging, vacuum sealed, flushed with nitrogen and then stored in deep freeze storage. However, in some embodiments, the ground product is instead introduced into other process steps as those discussed herein. In some embodiments, the packaged and stored product can be later used in other processes as well.

In some embodiments, the pulverized or ground coffee can be produced in concert with refrigeration of the grinding machinery. Also, in some embodiments, ground or pulverized coffee product can be cooled as it leaves the grinding machinery. In some embodiments the grinding machinery is refrigerated and also the pulverized or ground coffee product is cooled as it exits the grinding machinery.

In accordance with some embodiments, coffee can be processed as described above to maintain a pleasing flavor and aroma. In some embodiments, roasted whole bean coffee is processed under low temperatures, for example, less than about 15° C. and low relative humidity, for example, less than about 30%. In some embodiments, the internal temperature of the milling equipment is controlled to ensure a temperature of less than about 15° C. Roasted whole bean coffee beans can be pre-frozen and surfaces that come into contact with the coffee beans can be kept cooled with a cooling medium, such as, for example, liquid nitrogen, to avoid flavor loss and degradation.

Coffee exposure to oxygen can be minimized using conventional methods, for example, nitrogen purging, vacuum packaging, etc. Also, liquid nitrogen can be used as an oxygen scavenger during processing to minimize the degradative effects of oxygen. Coffee that is pulverized under such conditions retains much of its original flavor and aroma. Such pulverized coffee can be blended or encapsulated with coffee in various forms, including ground coffee, extracts, concentrate coffee, dried coffee, coffee oils, aromas (distillates), carbohydrates, soy products, dairy products or other agents and subsequently added to dry soluble coffee.

In some embodiments, coffee and other products being subjected to pulverization are deep frozen (colder than −5° C.) prior to grinding. This process allows for better pulverization of the product and yields more homogenous particles while minimizing the oxidation and degradation of the pulverized product. Lines supplying the grinder can be equipped with, for example, refrigerants or a liquid nitrogen feeding system in order to maintain the low temperature and efficiency. Cooling and scavenging gases are ideal, since they can provide cooling and removal of oxidizing elements. To minimize condensation, the equipment can be insulated to avoid surface and internal condensations in the conveying equipment, pulverizing equipment and collection/storage equipment of the milled product.

Any type of grinding equipment can be used in the present embodiments, for example, a cage mill, a hammer mill, etc. to pulverize a product such as coffee. In some embodiments, the equipment is maintained at very low temperatures (20° C. to −50° C.) via cooling media. This helps maintain the integrity of the material being pulverized. Liquid nitrogen or other refrigerants can be used to cool the equipment. Pulverization generates heat, which combined with exposed oxygen, can often degrade the pulverized product. Feeding liquid nitrogen to the grinding cavity is one example of a way to keep the grinding machine at low temperatures as well as displacing and scavenging oxygen.

In some embodiments the pulverized product falls into a refrigerated container at from about 0° C. to about 20° C. In some embodiments the pulverized product falls into a refrigerated container at less than about 20° C. Some embodiments involve using liquid nitrogen cooling of the container including liquid or gas nitrogen inside the container for product preservation. During operation, the discharging cavity should be continually flushed with gaseous nitrogen to minimize oxidation. In some embodiments, the operation takes place under controlled environmental conditions to protect the resulting product from moisture uptake.

In some embodiments, in order to ensure quality, the final product is moved to an oxygen free environment, vacuum packed, sealed and stored under deep freeze conditions (about −20° C. or colder), until used or sold.

Some embodiments relate to blending pulverized components in with liquid (wet blending) and dry (dry blending) coffee ingredients and/or related products. The dry or wet blending operation is the process of incorporating, adding, infusing, mixing, encapsulating, spraying or fluidizing, etc, the pulverized product into a coffee or appropriate product stream at required ratio to deliver design aroma, flavor, and appearance. Adequate processing (ribbon blender, PK blenders, fluidizing beds, coaters or others) and mixing equipments can be used to ensure homogeneity. In some embodiments the wet blending takes place at controlled temperatures, e.g., less than about 15° C. Rotation, cycle time and control of the process can differ, however, in some embodiments, these variables are controlled in such a way as to ensure uniform distribution, and prevent foaming and particle segregation.

In some embodiments, dry blending occurs in an enclosed blender and a controlled environment to minimize oxidation and moisture exposure. Upon blending, the product can be readily stored in proper packaging, such as, for example packed tightly to form a brick like package with nitrogen flushing and maintained under controlled conditions, such as temperatures less than about 10° C.

In some embodiments, the physicochemical and sensory attributes of pulverized products can also be protected by means of encapsulation (spray-drying, coating, extrusion, coacervation and molecular inclusion). Some embodiments utilize microencapsulation. With encapsulation, the encasing layer is attained, for example, via molecular, interfacial, colloidal and bulk physicochemical properties of emulsions. The encasement reduces the reactivity of the core with regard to outside environment, for example oxygen and water. This permits the extension of shelf life of a product in conventional packaging applications. In some embodiments, encapsulation can be used for controlled release of the inner material or core. The encased pulverized product can remain inactive until direct contact with water. Then the water can dissolve the encasement and the pulverized product is able to react with water, releasing aromas and flavors.

In some embodiments, the encapsulation of pulverized coffee can be used to optimize product functionality, particle size and/or create a new product form. Encapsulation can be done with products including, coffee extracts, coffee concentrates, dry pulverized coffee, coffee oils or other oils, aromas, functional ingredients, etc. In addition, pulverized products can be encapsulated by carbohydrates, soy products, dairy products or other agents to protect against environmental elements Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of making a soluble coffee product, comprising:
   pulverizing coffee beans to form a first pulverized coffee product,
   grinding or pulverizing coffee beans to form a second ground or pulverized coffee product,
   extracting the second ground or pulverized coffee product to form an extracted coffee product and spend coffee grounds,
   combining a first portion of the first pulverized coffee product with the extracted coffee product to form a first coffee blend,
   drying the first coffee blend to form a first dried coffee blend,
   combining a second portion of the first pulverized coffee product with the first dried coffee blend to form the soluble coffee product.

2. The method of claim 1 wherein the coffee is pre-frozen before being pulverized.

3. The method of claim 1, wherein the coffee is not pre-frozen before being pulverized, further comprising the step of refrigerating the grinding and pulverizing machinery.

4. The method of claim 1, wherein the coffee is pre-frozen, further comprising the step of refrigerating the grinding and pulverizing machinery.

5. The method of claim 1, wherein the first pulverized coffee product has a mean particle size of about 350 microns or less.

6. The method of claim 1, wherein the first pulverized coffee product has a median particle size of about 350 microns or less.

7. The method of claim 1, further comprising adding an additive selected from the group consisting of coffee oils, non-coffee oils, non-coffee aromas, and coffee aromas.

8. The method of claim 1, further comprising adding at least one selected from the group consisting of coffee components, nutritional supplements, flavoring components and herbal components.

9. The method of claim 1, further comprising the step of adding to the first coffee blend at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

10. The method of claim 1, wherein the grinding or pulverizing is carried out at a temperature of from about 20° C. to about 50° C.

11. The method of claim 1, further comprising the step of refrigerating grinding and pulverizing machinery to a temperature of about −5° C. or less.

12. The method of claim 1, further comprising the step of packaging the soluble coffee product.

13. The method of claim 12, wherein the packaging is refrigerated.

14. The method of claim 12, wherein the packaging comprises vacuum sealing and flushing with nitrogen.

15. A method of making a soluble coffee product, comprising:
   grinding or pulverizing coffee beans to form a first ground or pulverized coffee product,
   grinding or pulverizing coffee beans to form a second ground or pulverized coffee product,
   pulverizing coffee beans to form a third pulverized coffee product,
   extracting the first ground or pulverized coffee product and separating the first ground or pulverized coffee product into a coffee flavor component and a coffee aroma component,
   extracting the second ground or pulverized coffee product to form a first extracted coffee product and spend coffee grounds,
   combining the coffee aroma component with the first extracted coffee product to form a first coffee blend,
   combining the first coffee blend with a first portion of the third pulverized coffee product to form a second coffee blend,
   drying the second coffee blend to form a first dried coffee blend, and
   combining a second portion of the third pulverized coffee with the first dried coffee blend to form the soluble coffee.

16. The method of claim 15 wherein the coffee is pre-frozen before the pulverizing.

17. The method of claim 15, wherein the coffee is not pre-frozen before the pulverizing, further comprising the step of refrigerating the grinding and pulverizing machinery.

18. The method of claim 15, wherein the third pulverized coffee product has a median particle size of about 350 microns or less.

19. The method of claim 15, wherein the third pulverized coffee product has a mean particle size of about 350 microns or less.

20. The method of claim 15, further comprising adding an additive selected from the group consisting of coffee oils, non-coffee oils, non-coffee aromas, and coffee aromas.

21. The method of claim 15, further comprising adding at least one selected from the group consisting of coffee components, nutritional supplements, flavoring components and herbal components.

22. The method of claim 15, further comprising the step of adding to the first coffee blend at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

23. The method of claim 15 wherein the pulverizing and grinding is carried out at a temperature of from about 20° C. to about 50° C.

24. The method of claim 15 wherein the pulverizing and grinding is carried out at a temperature of less than about 1° C.

25. The method of claim 15 wherein the temperature of the equipment and coffee product in each step is about −5° C. or less.

26. The method of claim 15, further comprising the step of packaging the soluble coffee product.

27. The method of claim 26, wherein the packaging is refrigerated.

28. The method of claim 26, wherein the packaging comprises vacuum sealing and flushing with nitrogen.

29. A method of making a soluble coffee product, comprising:
grinding or pulverizing coffee beans to form a first ground or pulverized coffee product,
grinding or pulverizing coffee beans to form a second ground or pulverized coffee product,
pulverizing coffee beans to form a third pulverized coffee product,
extracting the first ground or pulverized coffee product and separating the first ground or pulverized coffee product into at least a first extracted component and a second extracted component,
extracting the second ground or pulverized coffee product to form a first extracted coffee product and spend coffee grounds,
combining the second extracted component with the extracted coffee product to form a first coffee blend,
combining the first coffee blend with a first portion of the third pulverized coffee product to form a second coffee blend,
drying the second coffee blend to form a first dried coffee blend,
combining a second portion of the third pulverized coffee with the first dried coffee blend to form the soluble coffee.

30. The method of claim 29, wherein the first extracted component is a flavor component and the second extracted component is an aroma component.

31. The method of claim 29 wherein the coffee is pre-frozen before the pulverizing.

32. The method of claim 29, wherein the coffee is not pre-frozen before the pulverizing, further comprising the step of refrigerating the grinding and pulverizing machinery.

33. The method of claim 29, further comprising the step of adding to the first coffee blend at least one selected from the group consisting of coffee extract, concentrated coffee, dried coffee, coffee oils, coffee aromas (distillates), flavor powders, flavor oils, spices, ground or pulverized cocoa beans, ground or pulverized vanilla beans, vitamins, antioxidants, nutraceuticals, dietary fiber, an omega-3 oil, an omega-6 oil, an omega-9 oil, a flavonoid, lycopene, selenium, a beta-carotene, resveratrol, a vegetable extract, dry green coffee extract, wet green coffee extract and an herbal extract.

34. The method of claim 29 wherein the pulverizing and grinding is carried out at a temperature of from about 20° C. to about 50° C.

35. The method of claim 29 wherein the pulverizing and grinding is carried out at a temperature of less than about 1° C.

36. The method of claim 29 wherein the temperature of the equipment and coffee product in each step is about −5° C. or less.

37. The method of claim 29, further comprising the step of adding the first extracted component or the second extracted component to the first dried coffee blend.

38. The method of claim 29, further comprising the step of packaging the soluble coffee product.

39. The method of claim 38, wherein the packaging is refrigerated.

40. The method of claim 38, wherein the packaging comprises vacuum sealing and flushing with nitrogen.

* * * * *

UNITED STATES PATENT AND TRADEMARK OFFICE
CERTIFICATE OF CORRECTION

PATENT NO.        : 8,043,645 B2
APPLICATION NO.   : 12/170396
DATED             : October 11, 2011
INVENTOR(S)       : Robinson et al.

It is certified that error appears in the above-identified patent and that said Letters Patent is hereby corrected as shown below:

| Issued Patent | | Description of Discrepancy |
| --- | --- | --- |
| Column | Line | |
| (Item 56) Page 3 Col. 2 | 3 | Under U.S. Patent Documents, change "2006/0227866 A1 10/2006" to --2008/0227866 A1 09/2008--. |
| 9 | 47 | In Claim 1, change "spend" to --spent--. |
| 10 | 48 | In Claim 15, change "spend" to --spent--. |
| 11 | 48 | In Claim 29, change "spend" to --spent--. |

Signed and Sealed this
Twenty-fourth Day of April, 2012

David J. Kappos
*Director of the United States Patent and Trademark Office*